Aug. 22, 1961 M. WOJTOWICZ 2,997,127
STEPLADDER WITH IMPROVED STABILIZING LEGS
Filed Oct. 7, 1959 2 Sheets-Sheet 1

Michael Wojtowicz
INVENTOR.

BY *Clarence A. O'Brien*
*and Harvey B. Jackson*
Attorneys

Aug. 22, 1961 M. WOJTOWICZ 2,997,127
STEPLADDER WITH IMPROVED STABILIZING LEGS
Filed Oct. 7, 1959 2 Sheets-Sheet 2
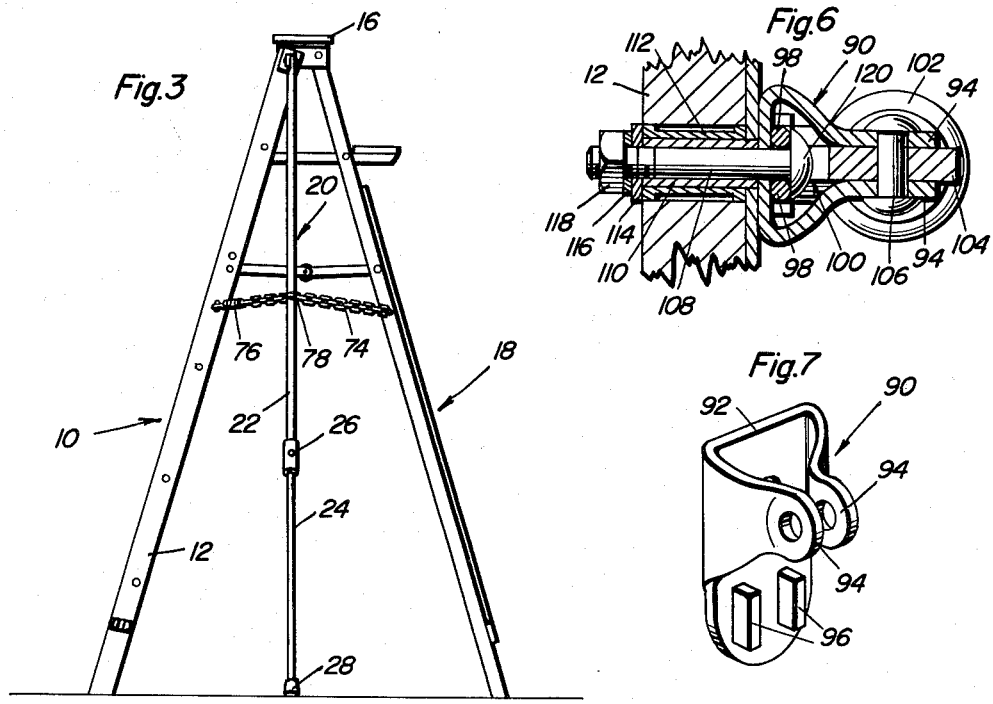
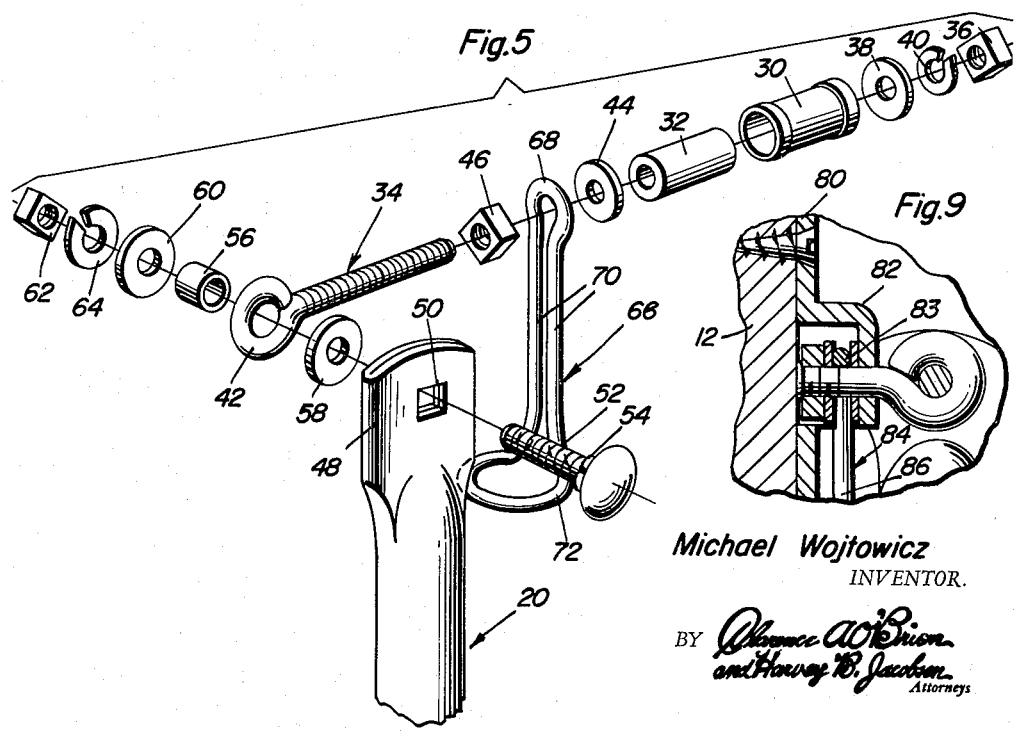
Michael Wojtowicz
INVENTOR.

United States Patent Office 2,997,127
Patented Aug. 22, 1961

2,997,127
STEPLADDER WITH IMPROVED
STABILIZING LEGS
Michael Wojtowicz, 3042 N. Sayre Ave., Chicago, Ill.
Filed Oct. 7, 1959, Ser. No. 844,930
3 Claims. (Cl. 182—172)

This invention has to do with a stepladder having improved hingedly mounted legs which swing out from the vertical sides of the leg-frames of the ladder and function as stabilizing props, that is, prevent the ladder from toppling over and subjecting the user to possible injury.

As the preceding statement of the invention implies, it is not new in the art to shore up a stepladder with suitably angled props. Therefore, it is an object of the instant endeavor to structurally, functionally and otherwise improve on prior art props, braces and stabilizers by way of the several improvements to be hereinafter revealed.

In carrying out one aspect of the invention it will be noticed that dual or two-way hinging means is employed in hingedly mounting the upper ends of the legs on the upper portion of the vertical side rails of the front leg frame of the ladder. That is to say, swivel means is directly mounted on the rail in each instance and the upper end of the leg is pivoted or hinged on the swivelling means making is possible to swing and adjust the leg either forwardly or rearwardly and also to be swung toward and from the leg frame. This construction provides a more or less universal joint and renders each leg versatile so that the angled propping position is suitable to the ladder and the surface on which it rests for support.

The invention also features a thrust or push-out spring for the upper hinged end portion of the leg causing the leg to "stay put" even if the ladder, while handling the same and shifting positions, is tilted to either the left or the right. In many prior art devices the mounting of the leg is such that the leg dangles freely and swings in toward the ladder in a highly undesirable and sometimes unsafe manner.

A further improvement resides, especially where industrial ladders are concerned, in the adoption and use of a chain for each propping leg. The chain spans the leg frame of the ladder and one end is attached by a coil spring. A shackling ring is provided on the leg and this in turn is slidably connected with the links of the chain so that the parts cooperate in enabling the chain to serve as a limiting stop for the outermost angled position of the leg in use. Spring clips are provided to hold the legs in their out-of-the-way or folded positions when the ladder is not in use.

Other and more specific features and advantages will become more readily apparent from the following description and the accompanying drawings.

In the drawings, wherein like numerals are employed to designate like parts throughout the views:

FIG. 3 is a view in side elevation of the construction seen in FIG. 2 observing the same either from left or right.

FIG. 5 is an exploded perspective view showing all of the primary components which go to make up the swivelling, hinging and attaching means.

FIG. 6 is a view somewhat similar to FIG. 4 but showing a modified construction.

FIG. 7 is a perspective view of the bracket utilized in the assemblage seen in FIG. 6.

FIG. 9 is a view in section and elevation showing how the assemblage or modification of FIG. 8 is actually applied to a ladder stile or leg and used.

Figure 1:
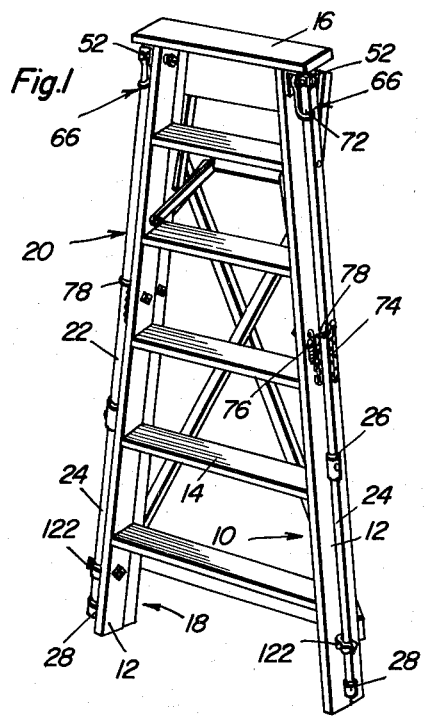
FIG. 1 is a view in perspective of a collapsed stepladder equipped with the improved prop-type stabilizing legs, the legs being clipped in their out-of-the way positions against the sides of the ladder.

In the drawings the front leg frame of the step ladder is denoted by the numeral 10 and comprises vertical stiles or side rails 12 with steps 14 supported therebetween. Fixed to the upper ends of the rails is the top step or platform 16 and hinged to this is the rear or back leg frame 18 of usual construction. In other words, this ladder is of a conventional type. It may be either for household purposes or industrial needs and requirements. As the drawings show one propping and stabilizing leg is provided for each side of the ladder. To simplify the description and to avoid duplication it is sufficient, it is believed, to describe but a single leg and show how it is constructed and mounted. The same numerals identify like parts for both legs.

The leg is denoted by the numeral 20. If desired it may be of an extensible or adjustable type. That is to say, it may have an upper tubular section 22, an extensible lower section 24 with suitable coupling means 26 between the sections. The lower end of the lower section is provided with a rubber antiskid tip 28.

Figure 4:
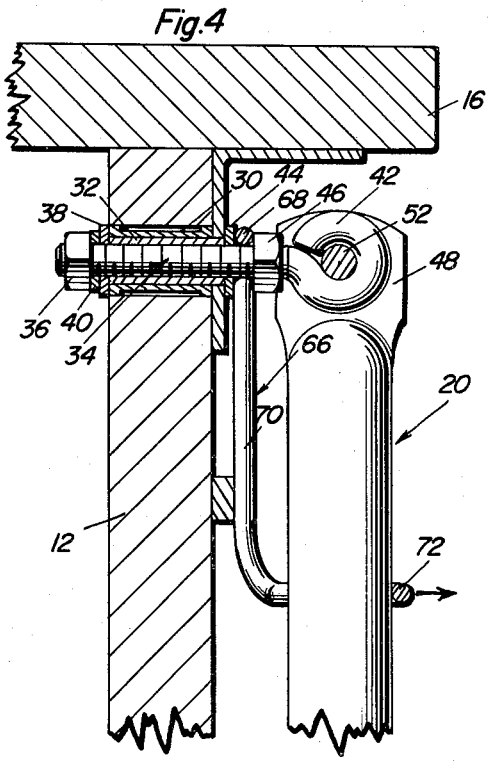
FIG. 4 is an enlarged view in section and elevation detailing the two-way swivelling and hinging means for the upper attached end of a single leg.

The manner of hingedly attaching the upper end of the leg is detailed in FIG. 4. Here it will be seen that the upper part of the rail has a horizontal bore providing an opening therethrough which serves to accommodate a lining providing a bearing 30. This bearing is lined with a bushing or sleeve 32. The swivelling or pivoting pin comprises a simple screw-threaded eye-bolt which is denoted generally at 34. At the left hand end in FIG. 4 an assembling and retaining nut 36 is provided and interposed therebetween is a suitable washer 38 and a lock washer 40. The eye-equipped end extends beyond the right hand end of the bushing, the eye being denoted at 42. There is a washer at 44 and an assembling nut at 46. The flattened upper end portion 48 of the leg 20 has an aperture 50 therethrough (FIG. 5) which serves to accommodate a hinging headed bolt 52. The aperture 50 is square to accommodate the square shoulder portion 54 at the headed end to key the parts together. This bolt passes through the eye and if desired the eye may be provided with a bushing 56 (not shown in FIG. 4) the shank of the bolt having washers 58 and 60 thereon. The assembling and retaining nut is shown at 62 and a lock washer at 64. It follows that with this two-way hinging construction the bolt 34 and its component parts is distinguished as a swivel and allows the leg to swing forwardly and rearwardly relative to the leg frames. The hinge means 42 and 52 permits the legs to swing in and out, that is laterally toward and from the leg frames.

Figure 2:
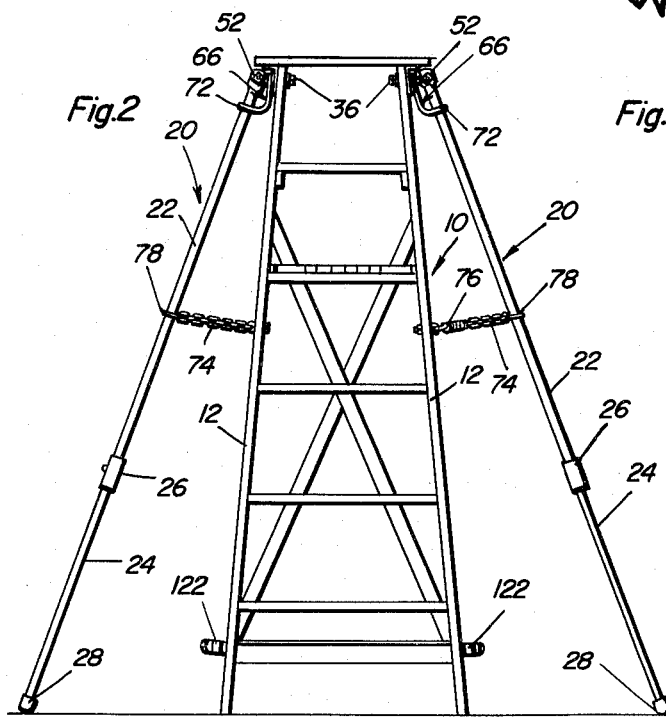
FIG. 2 is a front elevation view showing the ladder set up for use and also showing the left and right stabilizing legs occupying their bracing and stabilizing positions.

The aforementioned thrust spring device or spring means is denoted generally by the numeral 66. It is interposed between the rail 12 and the leg 20 as shown in FIG. 4. It is fashioned from resilient wire of the desired tension or spring properties. The upper bight portion 68 is mounted on the bolt 34 and held in place by the nut 46. The legs or limbs 70 extend downwardly into the existing space between 12 and 20 and on the lower end of the spring there is a ring or collar 72 which embraces the leg. The tension of the spring 66 is such that it serves to exert an outward thrust or force on the leg to keep the leg in its outwardly propped or inclined position seen in FIG. 2. Stated otherwise, this spring means 66 resists any tendency of the over-all leg to wobble and flop or to dangle too freely toward the ladder leg frames. In many prior art constructions a freely dangling prop or leg is a nuisance in that the leg swings in toward the ladder and sometimes gets between the front rear leg frames and is difficult to handle and often quite dangerous. This spring biased feature is therefore important.

In industrial ladders it may be desirable to employ a chain of suitable construction and flexibility which chain is denoted at 74 and which spans the leg frames 10 and 18 and has a coil spring 76 connecting one end to the rail 12. A ring 78 is slidingly mounted on the median portion of the leg and it in turn has sliding connection with the links of the chain 74 so that it does not interfere with the desired adjustment position of the leg. In any event, this chain limits the outward swinging or angled position of the over-all leg and the spring 76 takes up undesirable slack.

Figure 8:
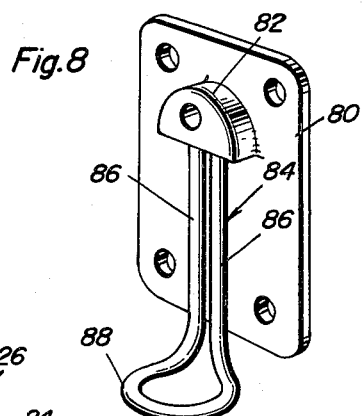
FIG. 8 is a perspective view of a modified spring-equipped fixture or bracket which may sometimes be used where wood screws are employed for attaching the bracket to the supporting rail therefor.

There may be instances wherein a different type of mounting for the spring means 66 is desired. Such a modification is seen in FIG. 8 wherein it will be noted that there is an attaching plate or fixture 80 which is adapted to be held in place by wood screws (FIG. 9). A projecting hollow hood portion 82 serves, as detailed in FIG. 9, to mount the upper portion 83 of the spring 84, the spring in this instance also having legs or limbs 86 joined with a ring or collar 88 to embrace the leg. This is a modification and is detailed in its assembled position as shown in FIG. 9.

It may also be desirable to use a different method of hingedly mounting the upper end of the leg for example by way of the bracket 90 shown in FIG. 7. This bracket comprises an attachable plate portion 92 with outstanding flanges terminating in apertured ears 94. The lugs 96 constitute simple spaced stops for the leg portions 98 (FIG. 6) of the push-out or thrust spring 100. In this arrangement the ring portion of the spring is denoted at 102 and embraces the leg in a manner already shown and described. The upper part 104 of the leg is positioned between the ears 94 and is connected thereto by a pivoting rivet 106. Here again a swivelling or hinging bolt is provided and this comprises a smooth shank bolt 108 extending through the bushing 110 fitting into the bearing 112 with the bearing mounted in an opening in the rail 12. The threaded end of the bolt is provided with a washer 114, a lock washer 116 and an assembling and retaining nut 118. The headed end 120 of the bolt serves to assemble and mount the plate 92 of the bracket 90 and also the aforementioned thrust spring 100 all as clearly illustrated in FIG. 6. Mechanically this construction and arrangement is the equivalent of that seen in FIG. 4 in that the main bolt means 108 provides a swivel allowing the leg to travel or swing back and forth from front to rear or vice versa. The hinge means 94, 104 and 106 allow the leg to swing inwardly and outwardly relative to the leg frames of the ladder.

In conclusion it is to be pointed out that suitable spring clips 122 are mounted on the lower portions of the side rails of the front leg frame to permit the leg sections 24 to snap therein so that the legs may be collapsed or folded when the latter is collapsed and folded as seen in FIG. 1.

In using the device all that is necessary, assuming that one leg is to be positioned, is to disengage the lower portion of said leg from the clip 122. The aforementioned push-out or thrust spring means, for example 66, serves to force the leg out against the chain and the spring takes up any slack. Obviously because of the swivelling and the hinging means providing the approximately "universal" joint, the leg can be moved or adjusted to almost any position and "locked" as it were on the chain. All of the components cooperate to keep the brace from falling back under the ladder in case of a slight tilt of the ladder.

As is true with most inventions in this line of endeavor the mode of use and the precise adjusted and regulated positions of the props or legs will be self-evident and readily appreciated by the user.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination, a stepladder embodying a top platform member and front and rear leg-frames operatively connected at upper ends to said platform member, at least one side-type stabilizing anti-toppling leg, means hingedly connecting the upper end of said leg to an upper portion of said stepladder, said means functioning to permit said leg to be moved and angled from front to back and also inwardly toward or outwardly and away from that side of the stepladder on which it is mounted, whereby said leg may be adjusted in various directions in a manner to serve as a ladder safeguarding prop, spring means connected with the hinged upper portion of said leg and constantly urging said leg to swing out and away from the stepladder, said spring means having one end embracing the leg and the other end pivotally connected to a suitable component part of said hinging means, and a chain fastened at its ends to median portions of said leg-frames, said leg being provided with means adjustably connecting the same to the chain, said chain limiting the outermost propping position of the leg, and one end of said chain having a slack take-up coil spring.

2. A stepladder comprising a side rail, an eyebolt journaled transversely in said rail, a lateral brace for the stepladder pivotally connected to the eyebolt for inward and outward swinging movement, and means for yieldingly urging the brace outwardly, said means including a spring comprising parallel legs, a loop on one end of said legs receiving the eyebolt for mounting the spring thereon, and a right angularly extending loop on the other ends of the legs encircling the brace for operatively connecting said spring thereto.

3. A stepladder comprising a rail, a bolt rotatably mounted on said rail, a brace pivotally mounted on said bolt for lateral swinging movement toward and away from the ladder, and a generally inverted U-shaped spring mounted astraddle the bolt and depending therefrom between the brace and the ladder for yieldingly urging the former outwardly, said spring including a horizontal loop on its lower end receiving the brace for operatively connecting said spring thereto.

References Cited in the file of this patent

UNITED STATES PATENTS

| | | |
|---|---|---|
| 480,655 | Bushnell | Aug. 9, 1892 |
| 947,409 | Hudson | Jan. 25, 1910 |
| 2,167,157 | Muehlberg | July 25, 1939 |
| 2,652,184 | Loucks | Sept. 15, 1953 |
| 2,690,942 | Marcus | Oct. 5, 1954 |

FOREIGN PATENTS

| | | |
|---|---|---|
| 883,708 | France | Mar. 29, 1943 |